US012789697B2

(12) United States Patent
Lee

(10) Patent No.: US 12,789,697 B2
(45) Date of Patent: Nov. 10, 2026

(54) LAMP

(71) Applicants: HYUNDAI MOTOR COMPANY, Seoul (KR); KIA CORPORATION, Seoul (KR)

(72) Inventor: Seong Hoon Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/270,154

(22) Filed: Jul. 15, 2025

(65) Prior Publication Data

US 2026/0167088 A1 Jun. 18, 2026

(30) Foreign Application Priority Data

Dec. 17, 2024 (KR) ........................ 10-2024-0188240

(51) Int. Cl.
*B60Q 1/00* (2006.01)
*B60Q 1/06* (2006.01)

(52) U.S. Cl.
CPC ............ *B60Q 1/0005* (2013.01); *B60Q 1/06* (2013.01)

(58) Field of Classification Search
CPC ................................ B60Q 1/0005; B60Q 1/06
See application file for complete search history.

(56) References Cited

U.S. PATENT DOCUMENTS

| | | | | |
|---|---|---|---|---|
| 4,638,666 A * | 1/1987 | Wong | B60Q 3/10 73/431 |
| 5,128,841 A * | 7/1992 | Maglica | F21V 21/30 362/421 |
| 5,270,911 A * | 12/1993 | Maglica | F16M 11/14 362/396 |
| 6,371,628 B1 * | 4/2002 | Ward | F21V 21/30 362/427 |
| 9,573,513 B2 * | 2/2017 | Takii | B60Q 1/10 |
| 10,344,952 B2 * | 7/2019 | Georgiev | F21V 21/26 |
| 10,625,659 B2 * | 4/2020 | Tajima | B60Q 1/0683 |
| 11,667,234 B2 * | 6/2023 | Maruyama | B60S 1/66 362/555 |
| 12,123,574 B2 * | 10/2024 | Georgiev | F21V 21/045 |
| 12,228,274 B2 * | 2/2025 | Hu | F21V 21/30 |
| 2004/0208017 A1 * | 10/2004 | Takiguchi | B60Q 1/12 362/524 |
| 2007/0025105 A1 * | 2/2007 | Inoue | F21S 45/48 362/249.07 |
| 2008/0106909 A1 * | 5/2008 | Kusagaya | B60Q 1/0683 362/523 |
| 2008/0130301 A1 * | 6/2008 | Kusagaya | B60Q 1/076 362/466 |
| 2015/0217676 A1 * | 8/2015 | Tajima | F16H 19/08 74/89.14 |
| 2019/0092219 A1 * | 3/2019 | Tajima | B60Q 1/0683 |
| 2019/0092220 A1 * | 3/2019 | Aizawa | B60Q 1/0064 |
| 2019/0210512 A1 * | 7/2019 | Mizuguchi | B60Q 1/0683 |
| 2022/0371508 A1 * | 11/2022 | Chiron | F21S 41/40 |
| 2025/0389402 A1 * | 12/2025 | Lee | B60Q 1/0683 |

* cited by examiner

*Primary Examiner* — Bryon T Gyllstrom

(74) *Attorney, Agent, or Firm* — MCDONNELL BOEHNEN HULBERT & BERGHOFF LLP

(57) ABSTRACT

A lamp includes a lamp housing, an aiming bracket provided with a light source module coupled thereto and rotatably disposed around a pivot center, and a support portion coupled to an inside of the lamp housing and rotatably supporting the aiming bracket. The pivot center is provided on an outside of the aiming bracket.

16 Claims, 14 Drawing Sheets

LAMP

CROSS REFERENCE TO RELATED APPLICATIONS

This application claims benefit of priority to Korean Patent Application No. 10-2024-0188240 filed on Dec. 17, 2024 in the Korean Intellectual Property Office, the disclosure of which is incorporated herein by reference in its entirety.

BACKGROUND

1. Field

The present disclosure relates to a lamp.

2. Description of Related Art

In general, headlamps of a vehicle are installed on both sides of the front of the vehicle to irradiate light forwards so that the driver may easily recognize objects ahead when the vehicle is driving on the road at night.

Such headlamps are restricted by relevant laws and regulations in order to prevent the driver of an oncoming vehicle from being blinded. If the headlamp irradiation angle deviates from the relevant laws and regulations, aiming is required to adjust the headlamp irradiation direction up and down and left and right. In this case, the headlamp aiming device is a device that changes the irradiation direction by adjusting the irradiation angle of the headlamp.

Aiming may be performed by the driver manually operating the aiming screw to adjust the irradiation direction of the light, or the driver may use an actuator, or the like to automatically adjust the irradiation direction of the light by operating the aiming screw while riding in the vehicle.

Such a headlamp aiming device is a component that may require strong vibration resistance, and thus should be designed to have a structure that is resistant to vehicle vibration.

SUMMARY

An aspect of the present disclosure is to provide a lamp having a structure resistant to vibrations of a vehicle.

The present disclosure is not limited to the usage mentioned above, and other uses not mentioned will be clearly understood by those skilled in the art to which the present disclosure belongs from the description below.

According to an aspect of the present disclosure, a lamp includes a lamp housing, an aiming bracket provided with a light source module coupled thereto and rotatably disposed around a pivot center, and a support portion coupled to an inside of the lamp housing and rotatably supporting the aiming bracket. The pivot center is provided on an outside of the aiming bracket.

The lamp may include a pivot portion supporting the aiming bracket by contacting the support portion and coupled to both ends of the aiming bracket, and a contact surface of the pivot portion and the support portion may be spherical.

The lamp may include a first pivot portion having a first contact surface and provided above the aiming bracket, and a second pivot portion having a second contact surface and provided below the aiming bracket.

A first center of a sphere formed by the first contact surface and a second center of a sphere formed by the second contact surface may be provided to be the same as the pivot center.

A first radius of a sphere formed by the first contact surface may be provided to be smaller than a second radius of a sphere formed by the second contact surface.

A contact area of the second contact surface may be provided to be larger than a contact area of the first contact surface.

The aiming bracket may further include a base plate to which the light source module is coupled, and the base plate may be provided between the first pivot portion and the second pivot portion.

The lamp may further include a third pivot portion spaced apart from the first pivot portion and the second pivot portion and having a third contact surface, and the third contact surface may be spherical.

A third center of a sphere formed by the third contact surface may be provided to be the same as the pivot center.

A third radius of a sphere formed by the third contact surface may be provided to be larger than a first radius of a sphere formed by the first contact surface and a second radius of a sphere formed by the second contact surface.

A first vertex of the first contact surface, the pivot center, and a second vertex of the second contact surface may be connected by a virtual first straight line, and the third pivot portion may be configured to be spaced apart from the first straight line.

The lamp may further include a first aiming unit connected to a vertical aiming point of the aiming bracket and rotating the aiming bracket in a vertical direction; and a second aiming unit connected to a horizontal aiming point of the aiming bracket and rotating the aiming bracket in a horizontal direction.

A first vertex of the first contact surface, the pivot center, and a second vertex of the second contact surface may be connected by a virtual first straight line, and the vertex aiming point may be located on the virtual first straight line.

Each of the first aiming unit and the second aiming unit may include a main body having an aiming screw and a pivot head, and a retainer into which the pivot head is rotatably inserted, and the retainer may be fixedly connected to the aiming bracket.

BRIEF DESCRIPTION OF THE FIGURES

The above and other aspects, features, and advantages of the present disclosure will be more clearly understood from the following detailed description, taken in conjunction with the accompanying drawings, in which.

DETAILED DESCRIPTION

Figure 1:
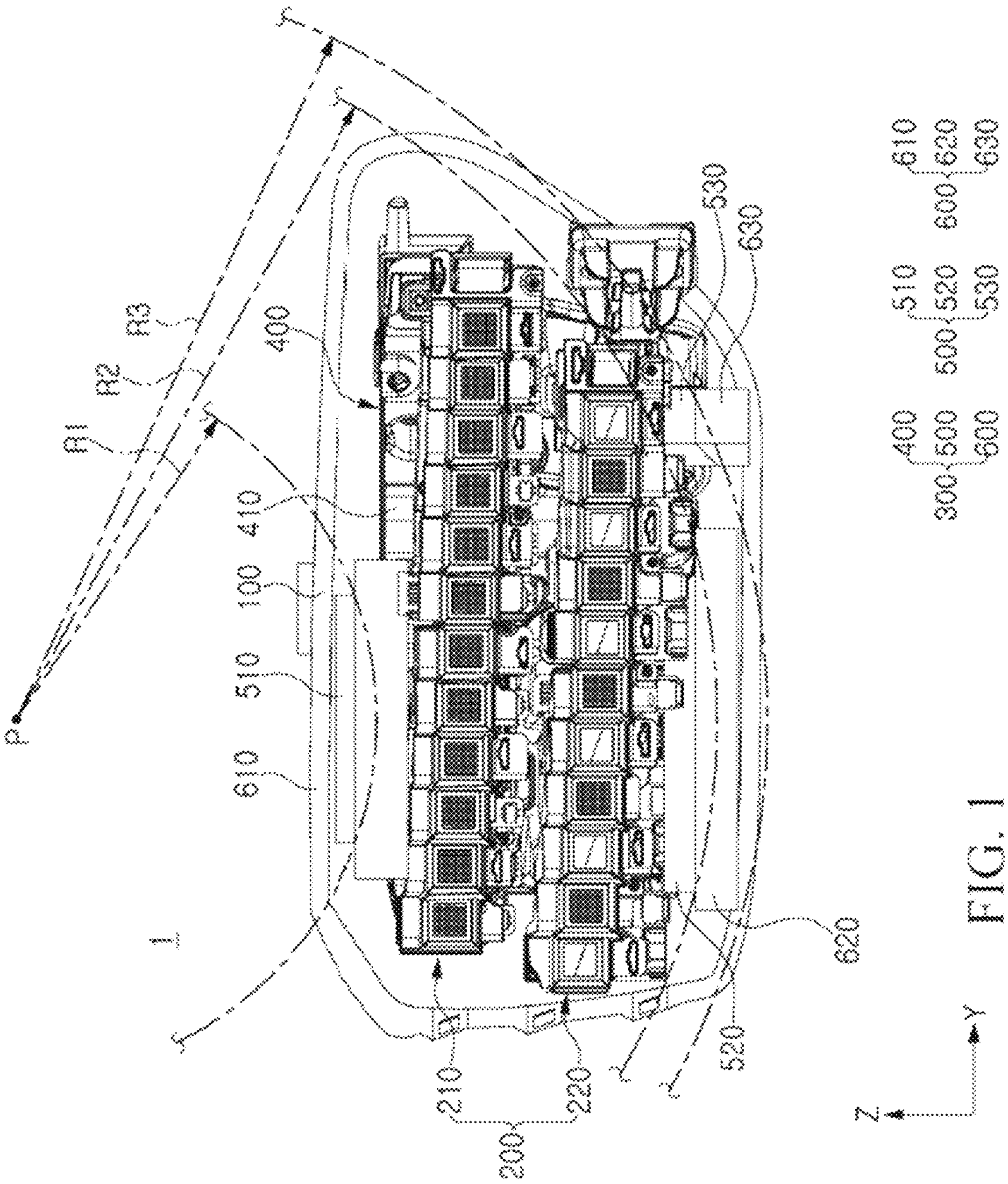
FIG. 1 is a front view of a lamp according to an embodiment.

Since the present disclosure may have various changes and may have various embodiments, specific embodiments are illustrated in the drawings and described in detail. However, this is not intended to limit the present disclosure to a specific embodiment, and it should be understood to include all modifications, equivalents and substitutes included in the spirit and scope of the present disclosure.

Terms such as first, second, etc. may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The term "and/or" includes a combination of a plurality of related listed items or any of a plurality of related listed items.

The terms used in the present specification are only used to describe specific embodiments, and are not intended to limit the present disclosure. The singular expression includes the plural expression unless the context clearly dictates otherwise. In the present specification, terms such as "comprise" or "have" are intended to designate that a feature, number, step, operation, component, part, or combination thereof described in the specification exists, but it should be understood that it does not preclude the possibility of the presence or addition of one or more other features, numbers, steps, operations, components, parts, or combinations thereof.

Unless defined otherwise, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning in the context of the related art, and should not be interpreted in an ideal or excessively formal manner unless explicitly defined in the present application.

In this specification, a vehicle refers to various vehicles that move a transported object such as a person, an animal, or an object from a starting point to a destination. The vehicles are not limited to vehicles that run on roads or tracks.

Hereinafter, embodiments of the present disclosure will be described with reference to the drawings.

Figure 2:
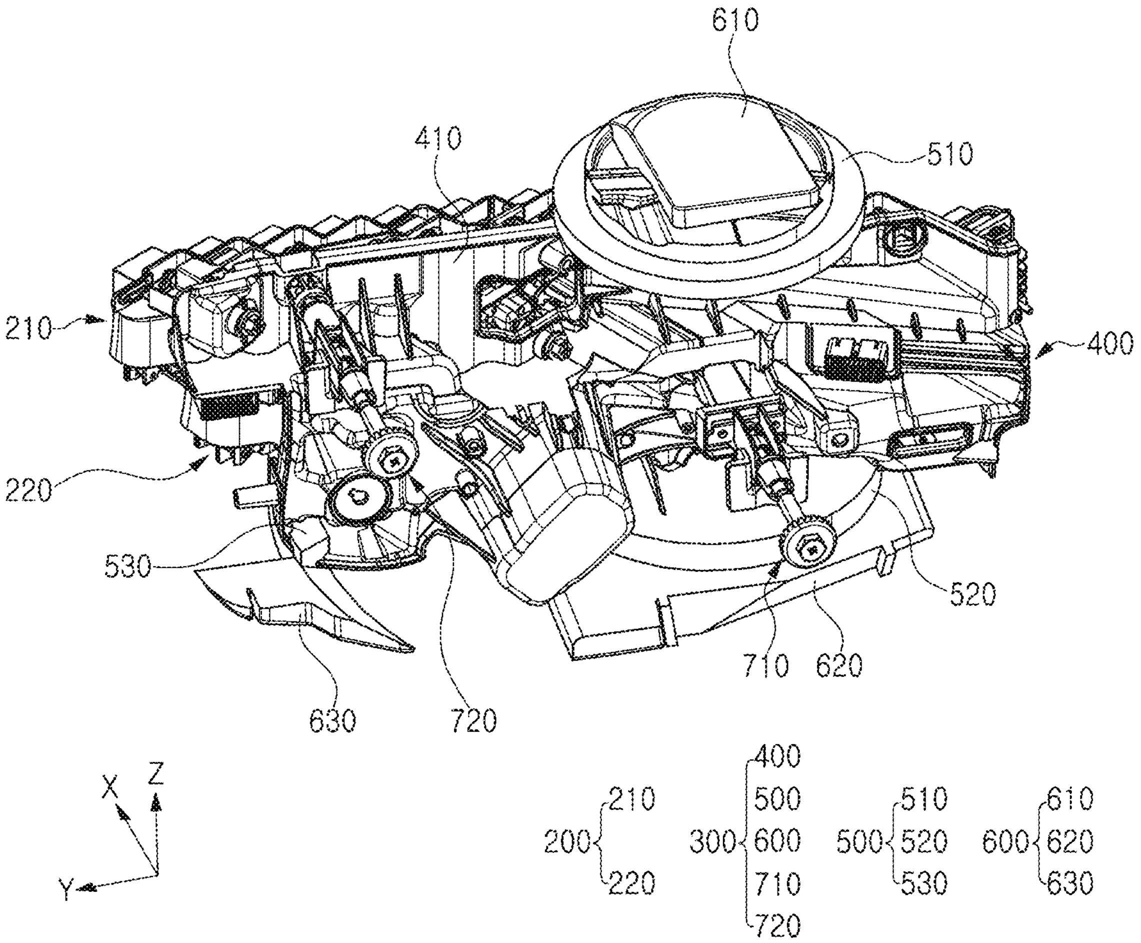
FIG. 2 is a rear perspective view of a lamp according to an embodiment.
Figure 3:
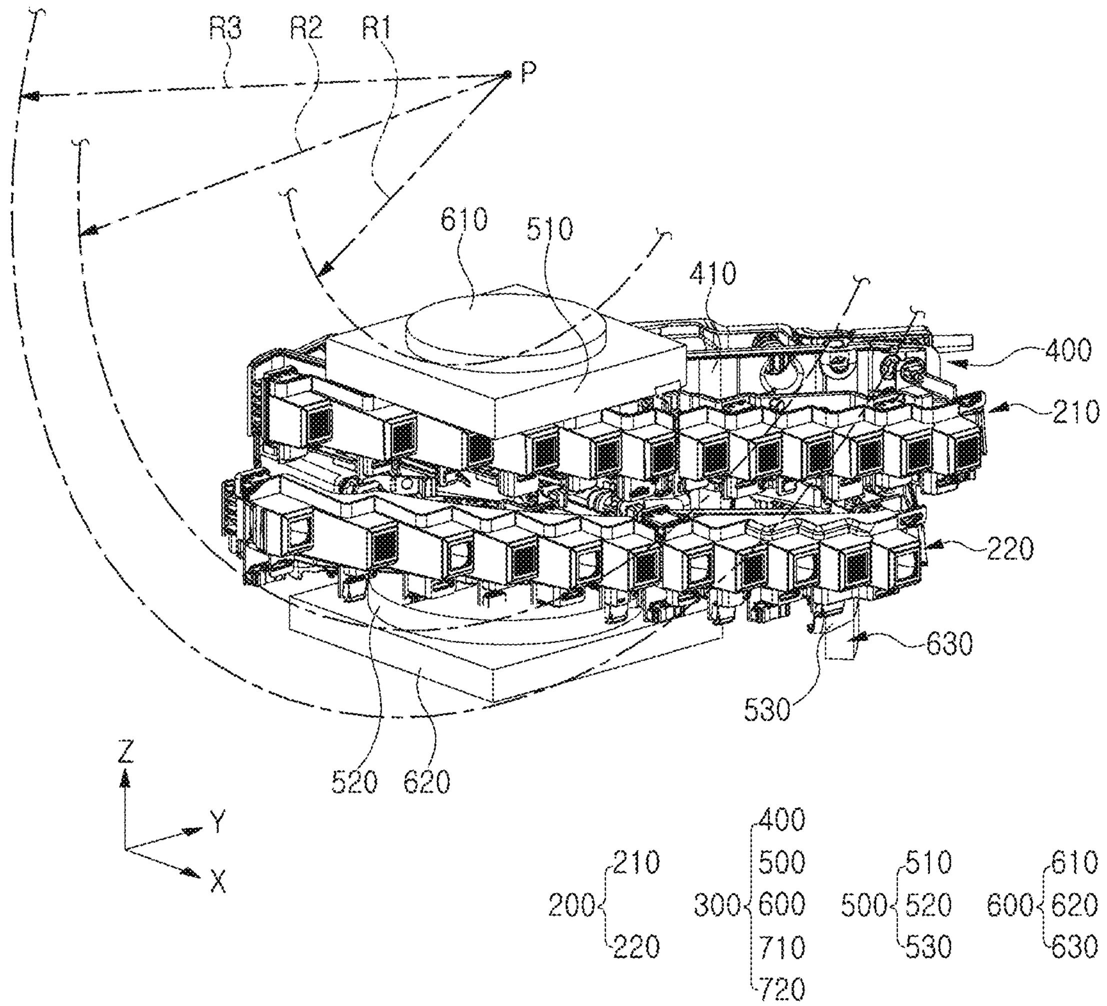
FIG. 3 is a front perspective view of a lamp according to an embodiment.
Figure 4:
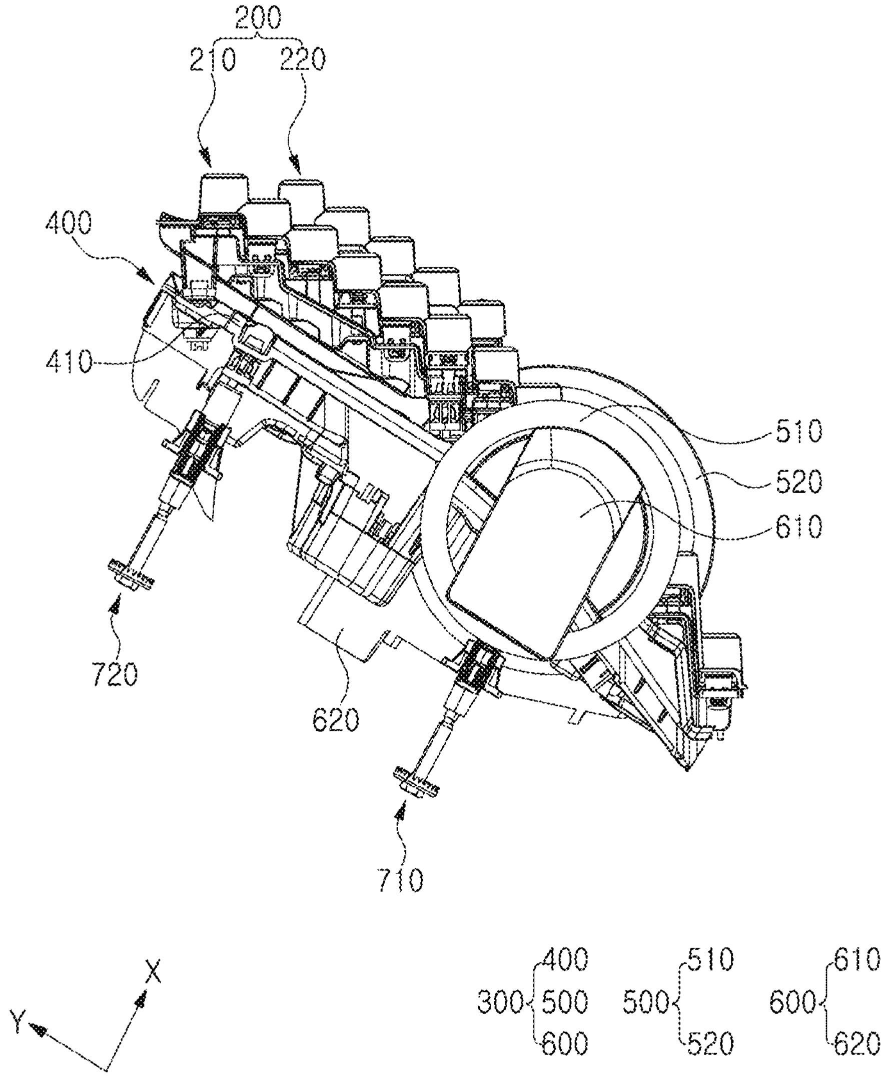
FIG. 4 is a top view of a lamp according to an embodiment.
Figure 5:
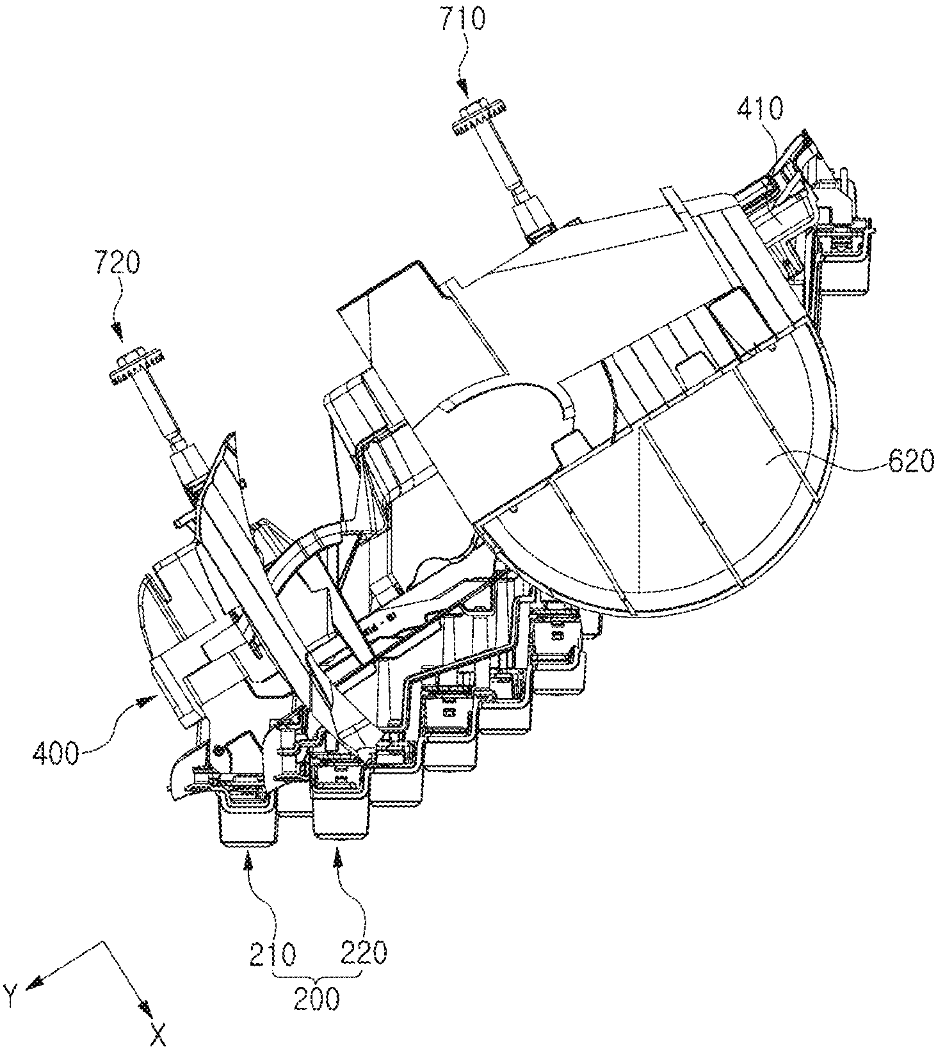
FIG. 5 is a bottom view of a lamp according to an embodiment.

FIG. 1 is a front view of a lamp 1 according to an embodiment, FIG. 2 is a rear perspective view of the lamp 1 according to an embodiment, FIG. 3 is a front perspective view of the lamp 1 according to an embodiment, FIG. 4 is a top view of the lamp 1 according to an embodiment, and FIG. 5 is a bottom view of the lamp 1 according to an embodiment.

FIGS. 2 to 5 may be drawings in which a housing 100 is omitted from the lamp 1 illustrated in FIG. 1.

The lamp 1 according to an embodiment may be a headlamp that irradiates light in the driving direction of the vehicle when the vehicle is driven at night or in a dark place to secure a forward view.

However, the lamp 1 according to an embodiment is not limited to a head lamp, and may be various lamps installed in a vehicle, such as a fog lamp, a tail lamp, a brake lamp, a turn signal lamp, a backup lamp, a daytime running lamp, a position lamp, or the like.

Referring to FIGS. 1 to 5, the lamp 1 according to an embodiment may include a housing 100, a body, a light source module 200, and an aiming device 300.

The housing 100 forms at least a portion of the exterior of the lamp 1, and may have a space provided therein in which the light source module 200 and the aiming device 300 are accommodated.

The housing 100 may be a component that is coupled to the vehicle body when the lamp 1 is mounted or assembled to the vehicle. The housing 100 may be formed so that one side is open, and may be configured so that a cover lens (not illustrated) is coupled to the open side.

The housing 100 may support the light source module 200 and the aiming device 300.

For example, the aiming device 300 to which the light source module 200 is coupled may be coupled to and supported by the housing 100.

The housing 100 may be coupled to the aiming device 300 in such a manner that most of the aiming device 300 is located inside the housing 100 but a part (for example, a part manipulated for aiming) is exposed to the outside of the housing 100. In this case, at least a portion of the aiming device 300 may be coupled to the housing 100 to be rotatable with respect thereto.

The light source module 200 is a component that provides or outputs light, and may include various components such as a reflector, a shield, a lens, and the like to form a suitable beam pattern in response to the type/use of the lamp 1, including a light source that generates light.

For example, the components, optical systems or the like included in the light source module 200 may be changed in various ways depending on the type/use of the lamp 1.

According to various embodiments, the light source module 200 may be referred to by various terms such as a lamp unit, a lamp module, a lamp assembly, a light source unit, or a light source assembly.

The light source module 200 may be coupled to an aiming device 300. The light source module 200 may be coupled to an aiming bracket 400 of the aiming device 300. For example, the light source module 200 may be fixedly coupled to the aiming bracket 400 to move integrally with the aiming bracket 400.

In detail, the light source module 200 may be provided so that the light irradiation direction, irradiation angle, or the like may be adjusted by aiming in the horizontal direction and/or vertical direction by the movement (for example, rotation, pivot) of the aiming bracket 400.

In this case, the horizontal direction (for example, Y-axis direction) may refer to a direction parallel to the ground when the vehicle equipped with the lamp 1 is on the ground, and the vertical direction (for example, Z-axis direction) may refer to a direction perpendicular to the ground when the vehicle equipped with the lamp 1 is on the ground.

One or more light source modules 200 may be provided. According to the illustrated embodiment, the light source module 200 may include a first light source module 210 and a second light source module 220 disposed on a lower side of the first light source module 210.

The first light source module 210 and the second light source module 220 may be disposed side by side in the vertical direction.

For example, the first light source module 210 may be disposed relatively higher in the aiming bracket 400, and the second light source module 220 may be disposed relatively lower in the aiming bracket 400.

However, the illustrated embodiment is an example, and the number of light source modules 200 and the position of the light source modules 200 are not limited to the illustrated embodiment, and may be variously changed depending on the type/use of the lamp 1.

The aiming device 300 may perform aiming by adjusting the direction/angle in which light is irradiated from the light source module 200 by rotating the light source module 200 in at least one of the horizontal direction (for example, the left-right direction) and the vertical direction (for example, the up-down direction).

The aiming device 300 may include an aiming bracket 400 to which a light source module 200 is coupled, a pivot portion 500 provided at both ends of the aiming bracket 400, a support portion 600 provided between the housing 100 and the pivot portion 500 and configured to rotatably support the aiming bracket 400 to form a pivot center of the aiming bracket 400, and aiming units 710 and 720 coupled to the aiming bracket 400 and configured to implement vertical and horizontal aiming.

The aiming device 300 of the lamp 1 according to an embodiment may have a structure in which aiming is performed while the aiming bracket 400 rotates along a trajectory on a surface of a sphere (for example, a spherical surface), with the center point of the sphere being located outside the aiming bracket 400.

To this end, the pivot portion 500 may be provided with a portion of a sphere, and the support portion 600 may be provided with a support surface having a spherical surface corresponding to the sphere.

Figure 6:
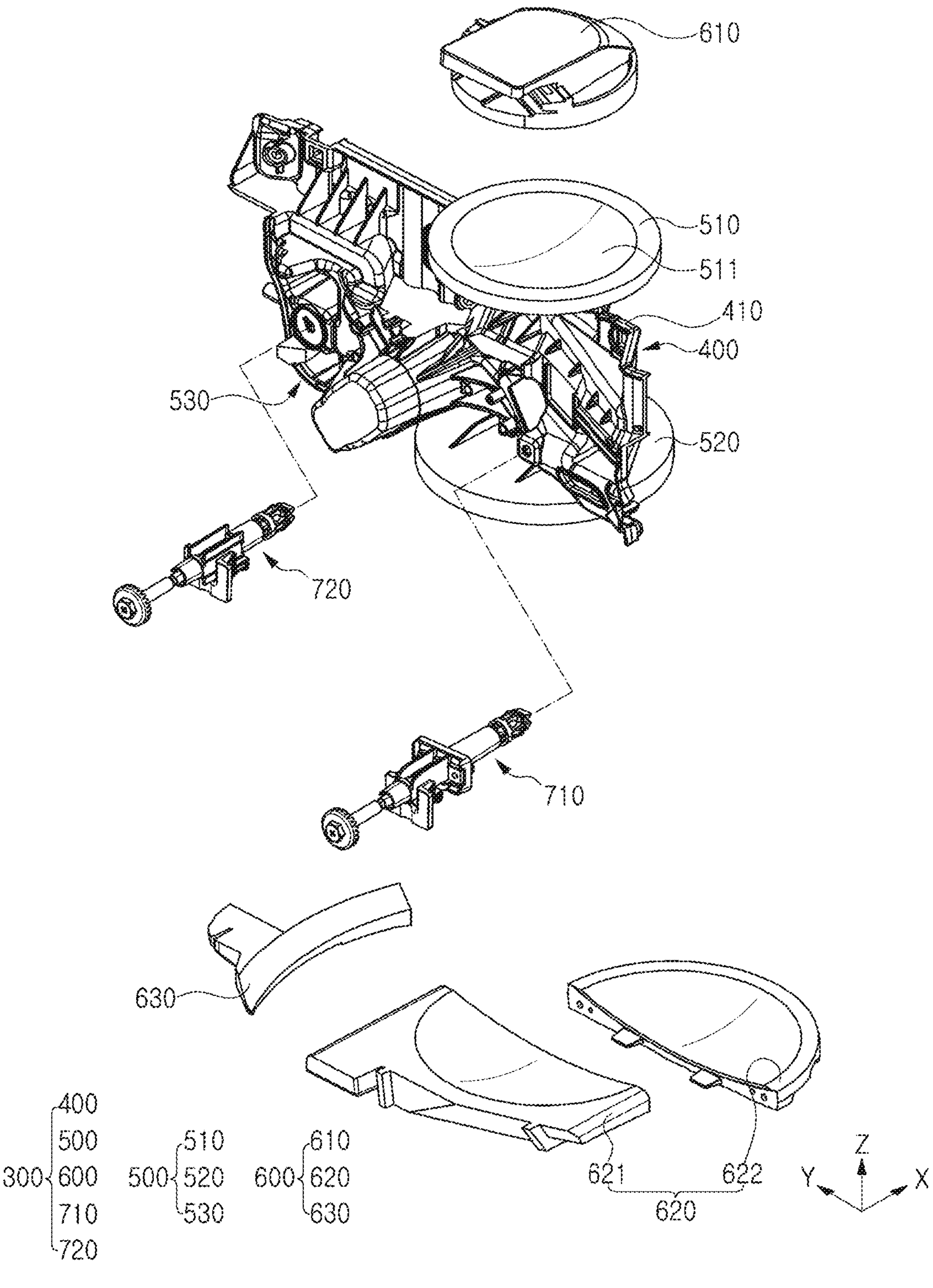
FIG. 6 is an exploded perspective view of an aiming device viewed from above according to an embodiment.
Figure 7:
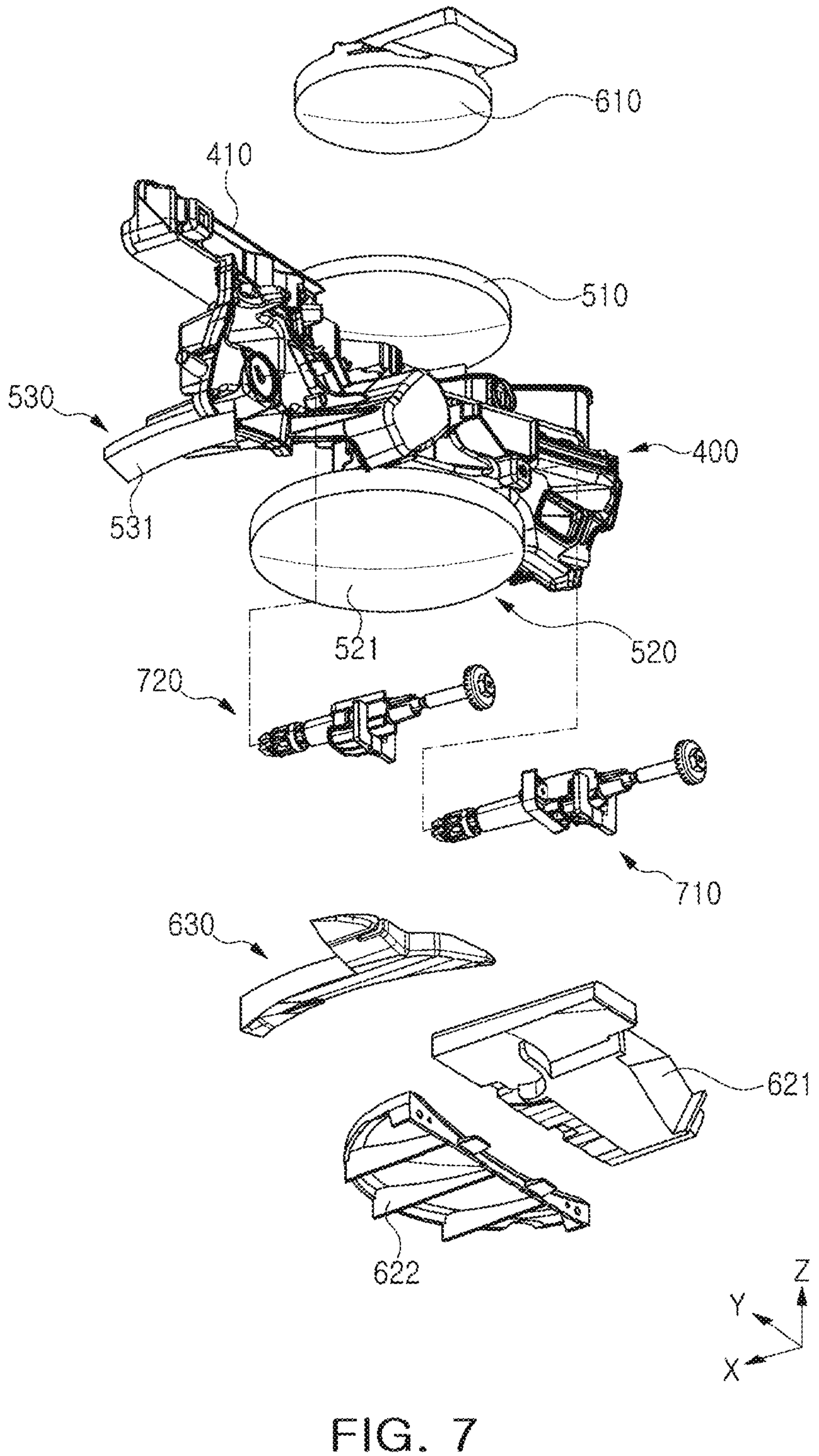
FIG. 7 is an exploded perspective view of an aiming device viewed from below according to an embodiment.
Figure 8:
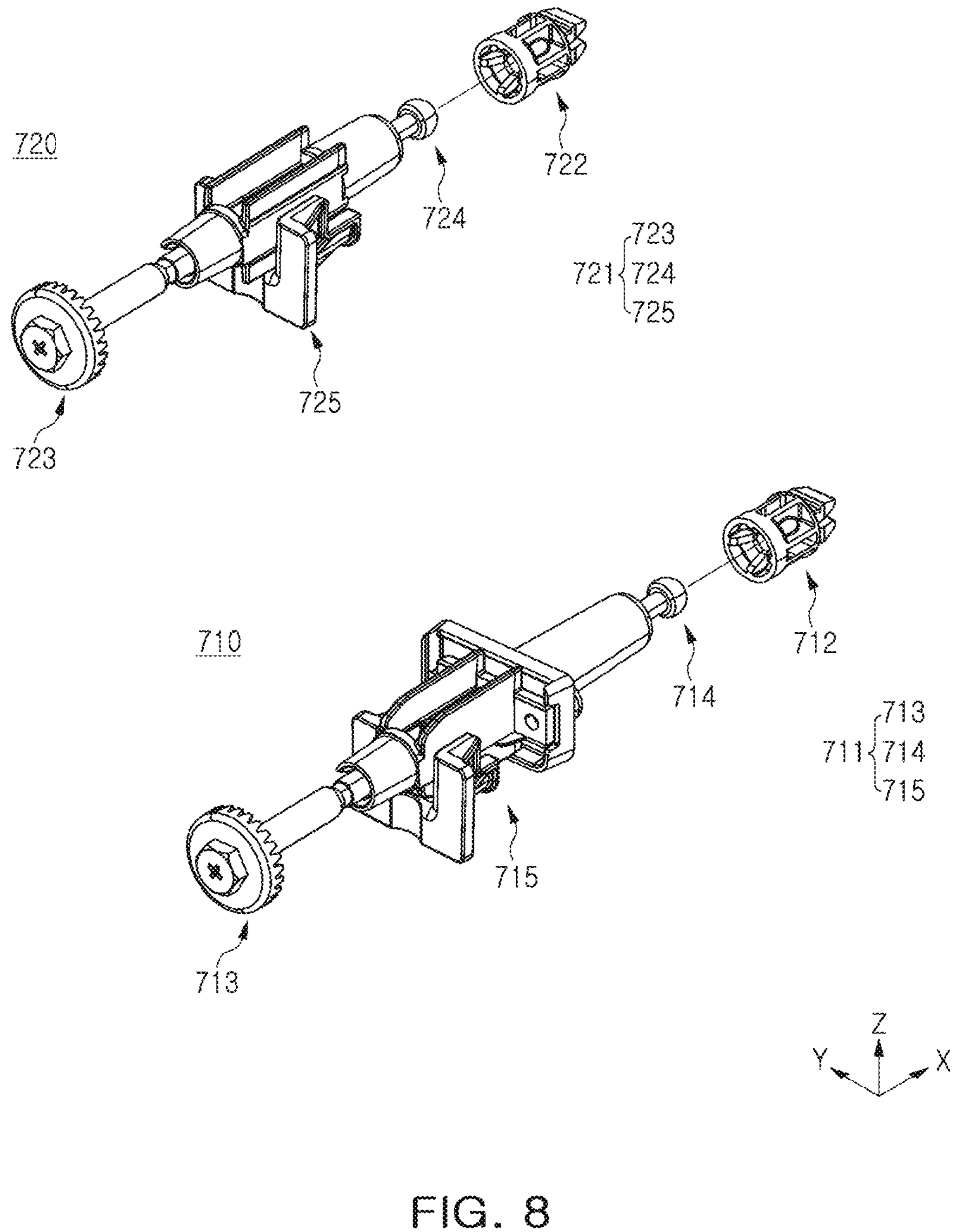
FIG. 8 is an exploded perspective view of an aiming unit of a lamp according to an embodiment.

FIG. 6 is an exploded perspective view of an aiming device 300 viewed from above according to an embodiment, FIG. 7 is an exploded perspective view of an aiming device 300 viewed from below according to an embodiment, and FIG. 8 is a perspective view of aiming units 710 and 720 of a lamp 1 according to an embodiment.

Together with reference to FIGS. 1 to 5, components of the aiming device 300 will be described in more detail with reference to FIGS. 6 to 8. FIGS. 6 to 8 are drawings illustrating in detail the structure of the aiming device 300 provided in the lamp 1 described above with reference to FIGS. 1 to 5, and thus, any redundant description will be omitted hereinafter.

FIGS. 6 and 7 may be drawings in which the light source module 200 is omitted from the lamp 1 according to an embodiment.

Referring to FIGS. 6 and 7 along with FIGS. 1 to 5, the aiming bracket 400 may be coupled with a light source module 200, a pivot portion 500, and aiming units 710 and 720, and may rotate up and down and/or left and right based on a pivot center located outside the aiming bracket 400 by the operation of the aiming units 710 and 720.

The aiming bracket 400 may include a base plate 410 to which the light source module 200 and the aiming units 710 and 720 are coupled, and a pivot portion 500 extending from the base plate 410.

The base plate 410 may have a coupling hole to which the aiming units 710 and 720 are coupled. For example, a first coupling hole to which a first aiming unit 710 (in detail, a first retainer 712) is coupled and a second coupling hole to which a second aiming unit 720 (in detail, a second retainer 722) is coupled may be formed in the base plate 410.

Meanwhile, although not indicated by a drawing symbol, the base plate 410 may be provided with a lamp 1 coupling portion for coupling and supporting a light source module 200.

The pivot portion 500 is a portion of the aiming bracket 400 that is rotatably supported by the support portion 600, and a contact surface thereof that comes into contact with the support structure may be formed as a spherical surface.

In this case, the pivot portion 500 may include a first pivot portion 510 positioned at the upper portion of the aiming bracket 400 and a second pivot portion 520 positioned below the aiming bracket 400, and the centers of the spheres formed by the first pivot portion 510 and the second pivot portion 520 may be formed identically, i.e., on the same axis.

In detail, the first pivot portion 510 and the second pivot portion 520 may have centers positioned outside the lamp 1, have the same centers, and have shapes corresponding to portions of a first sphere S1 having the first radius R1 and a second sphere S2 having the second radius R2, and may be referred to as rotating spheres that rotate within a predetermined range with respect to the support portion 600 based on the centers of the first sphere S1 and the second sphere S2. In this case, the centers of the first sphere S1 and the second sphere S2 may correspond to a pivot center P.

The first pivot portion 510 may have a spherical first contact surface 511 that is rotatably in contact with the first support portion 610, and the second pivot portion 520 may have a spherical second contact surface 521 that is rotatably in contact with the second support portion 620.

The first contact surface 511 of the first pivot portion 510 may correspond to a portion of a first sphere S1 having a first radius R1 from the pivot center, and the second contact surface 521 of the second pivot portion 520 may correspond to a portion of a second sphere S2 having a second radius R2 from the same center as the first sphere S1 forming the first contact surface 511, for example, the pivot center P.

According to the illustrated embodiment, the first pivot portion 510 and the second pivot portion 520 may be formed with different sizes. The second pivot portion 520 may be larger than the first pivot portion 510.

For example, the second contact surface 521 of the second pivot portion 520 that supports the load may have a larger area than an area of the first contact surface 511 of the first pivot portion.

However, this is an example, and the shape of the aiming bracket 400 according to the present disclosure is not limited to the illustrated embodiment, and the first pivot portion 510 and the second pivot portion 520 may be formed such that the areas of the first contact surface 511 and the second contact surface 521 are the same, or the first contact surface 511 may have a larger area than the second contact surface 521.

The second pivot portion 520 may be provided on a vertically lower side (for example, in the −Z-axis direction) of the aiming bracket 400 from the pivot center P so that the load of the aiming device 300 (or lamp 1) may be supported from below by the second support portion 620.

For example, the second pivot portion 520 may be formed so that a second vertex V2, which is the most convex point on the second contact surface 521, is aligned with the pivot center P in a vertical direction (for example, in the Z-axis direction).

The first pivot portion 510 may be provided on a vertically upward side (for example, in the +Z-axis direction) of the aiming bracket 400 from the pivot center P, to correspond to the second pivot portion 520.

For example, the first pivot portion 510 may be formed so that a first vertex V1 of the first contact surface 511 is aligned with the pivot center P and the second vertex V2 in a vertical direction (for example, Z-axis direction).

The first pivot portion 510 and the second pivot portion 520 may be connected by a virtual first straight line in which the first vertex V1 of the first contact surface 511, the pivot center P, and the second vertex V2 of the second contact surface 521 are extended in a vertical direction.

The aiming bracket 400 according to the illustrated embodiment may be understood as being formed in a shape in which the first pivot portion 510 and the second pivot portion 520 face each other in a vertical direction based on the base plate 410 (in detail, the pivot center P) in consideration of load support and stable aiming operation.

In addition, the pivot portion 500 according to an embodiment may further include a third pivot portion 530 provided at a predetermined distance from the first straight line.

The third pivot portion 530 may have a third contact surface 531 having a spherical shape that rotatably contacts the third support portion 640, and the third contact surface 531 may correspond to a portion of a third sphere S3 having a third radius R3 from the pivot center.

In this case, the center of the third sphere S3 formed by the third pivot portion 530, and the centers of the first sphere S1 formed by the first pivot portion 510 and the second sphere S2 formed by the second pivot portion 520, may be formed as the pivot center all identically.

The third pivot portion 530 may be provided at a predetermined distance from the first straight line. The third pivot portion 530 may be provided below the end of the light source module 200, and may be provided near and below the end of the light source module 200 having a predetermined length, such as the light source module 200 illustrated in FIG. 1.

The third pivot portion 530 is provided at a predetermined distance from the first straight line, on the lower portion of the light source module 200, to support the load of the light source module 200, thereby reducing the moment applied to the first pivot portion 510 and the second pivot portion 520 due to the load of the light source module 200, and supporting the light source module 200 more stably.

However, this is an example, and the shapes and positions of the first pivot portion 510, the second pivot portion 520, and the third pivot portion 530 in the aiming bracket 400 are not limited to the illustrated form.

According to various embodiments, the first pivot portion 510, the second pivot portion 520, and the third pivot portion 530 may be provided at various positions within a range where they are supported by the support portion 600 and the aiming bracket 400 may implement a motion of rotating around the pivot center P.

The support portion 600 may rotatably support the aiming bracket 400. The support portion 600 may rotatably support the pivot portion 500 by enabling spherical contact with the pivot portion 500 of the aiming bracket 400.

For example, the support portion 600 may have a support surface that contacts and supports the contact surface of the pivot portion 500, and the support surface of the support portion 600 may be formed in a spherical shape corresponding to the contact surface. In detail, the contact surface of the pivot portion 500 and the support surface of the support portion 600 may be spherical surfaces having the same curvature.

The support portion 600 may include a first support portion 610 corresponding to the first pivot portion 510, and a second support portion 620 corresponding to the second pivot portion 520. In addition, the aiming device 300 further including the third pivot portion 530 may further include a third support portion 640 corresponding to the third pivot portion 530.

For example, the support surface of the first support portion 610 may rotatably support the first contact surface 511 of the first pivot portion 510, the support surface of the second support portion 620 may rotatably support the second contact surface 521 of the second pivot portion 520, and the support surface of the third support portion 640 may rotatably support the third contact surface 531 of the third pivot portion 530.

Meanwhile, the first support portion 610, the second support portion 620, and the third support portion 640 may be provided in a form in which a plurality of parts (components) are combined.

For example, the second support portion 620 may be formed by combining two members.

The second support portion 620 may be formed by combining a first support body 621 and a second support body 622. The support surface of the second support portion 620 may be formed by connecting recessed portions respectively provided in the first support body 621 and the second support body 622.

According to the illustrated embodiment, the second support portion 620 may be formed so that the first support body 621 and the second support body 622 are asymmetrical.

For example, the first support body 621 of the second support portion 620 may have a step portion which is connected stepwise from a portion provided with the recessed portion and to which the second support body 622 is coupled.

The second support portion 620 may be provided in a form in which the recessed portions respectively provided in the first support body 621 and the second support body 622 are connected to each other to form a support surface as the second support body 622 is coupled to the step portion of the first support body 621.

However, the shape of the second support portion 620 is not limited by the illustrated embodiment, and according to various embodiments, the second support portion 620 may be formed in a shape in which the first support body 621 and the second support body 622 are symmetrical.

The support portion 600 may further include a buffer member 630 connected to at least one of the first support portion 610, the second support portion 620, and the third support portion 640.

For example, when the first support portion 610, the second support portion 620, and the third support portion 640 are coupled to the housing 100, the buffer member 630 may be disposed between at least one of the first support portion 610, the second support portion 620, and the third support portion 640 and the housing 100.

According to the illustrated embodiment, the buffer member 630 may be coupled to the upper portion of the first support portion 610.

For example, the buffer member 630 may be coupled to the upper portion of the first support body 621 of the first support portion 610.

When the first support portion 610 is coupled to the housing 100, the buffer member 630 may be disposed between the inner surface of the housing 100 and the first support portion 610 to absorb the clearance that occurs when assembling the aiming bracket 400.

Meanwhile, the support portion 600 illustrated in FIGS. 6 and 7 is an example, and the support portion 600 is not limited by the shape illustrated in the drawings and the description thereof described above.

For example, at least one of the first support portion 610, the second support portion 620, and the third support portion 640 may be provided as a single part (integral type) rather than a form in which two members are combined.

In addition, the buffer member 630 may be provided on all of the first support portion 610, the second support portion 620, and the third support portion 640, or may be provided only on the first support portion 610.

In addition, the support portion 600 may not be provided with a separate buffer member 630, and at least one of the first support portion 610 and the second support portion 620 may be formed of a material having a predetermined elasticity.

The aiming units 710 and 720 may include a first aiming unit 710 coupled to the aiming bracket 400 and provided to implement vertical aiming, and a second aiming unit 720 coupled to the aiming bracket 400 and provided to implement horizontal aiming.

For example, the first aiming unit 710 may rotate the aiming bracket 400 vertically or up and down based on the pivot center, and the second aiming unit 720 may rotate the aiming bracket 400 horizontally or left and right based on the virtual first straight line.

According to various embodiments, the first aiming unit 710 may be referred to as a vertical aiming unit, an up and down aiming unit, or an up and down irradiation angle adjustment unit, and the second aiming unit 720 may be referred to as a horizontal aiming unit, a left and right aiming unit, or a left and right irradiation angle adjustment unit.

Referring to FIG. 8, each of the first aiming unit 710 and the second aiming unit 720 may include a main body having an aiming screw, and a retainer which is coupled to an aiming bracket 400 and in which one end of the main body is fitted.

For example, the retainer may be a configuration that connects the aiming bracket 400 and the main body.

The retainer may be inserted into and coupled to a coupling hole provided in an aiming point of the aiming bracket 400.

For example, the first retainer 712 of the first aiming unit 710 may be coupled to a first coupling hole formed in a vertical aiming point of the aiming bracket 400, and the second retainer 722 of the second aiming unit 720 may be coupled to a second coupling hole formed in a horizontal aiming point of the aiming bracket 400.

The first aiming unit 710 of the aiming device 300 according to an embodiment may include a first main body 711 and a first retainer 712 coupled with the first main body 711. As described above, the first retainer 712 may be fixedly coupled to the aiming bracket 400 (in detail, the first coupling hole).

The first main body 711 may include a first pivot head 714 connected to the first aiming screw 713 and the first retainer 712, and a first moving member 715 screw-coupled with the first aiming screw 713.

The first moving member 715 may be capable of at least partially, linearly moving based on the rotation of the first aiming screw 713 as the first moving member 715 is screw-coupled with the first aiming screw 713.

For example, when rotational force is applied to the first aiming screw 713, the first moving member 715 may move in either a forward (for example, in the +X-axis direction) or backward (for example, in the −X-axis direction) direction depending on the rotational direction of the first aiming screw 713.

The first pivot head 714 may be provided in front of the first moving member 715.

The first retainer 712 may have a receiving groove (not illustrated) formed into which the first pivot head 714 is inserted. The first pivot head 714 may be inserted into the receiving groove to be movable or rotatable.

The first aiming unit 710 operates so that the first pivot head 714 rotates within the receiving groove of the first retainer 712 when the moving member moves linearly in either the forward or backward direction by the rotation of the first aiming screw 713, and thus, even when the first pivot head 714 moves linearly, the aiming bracket 400 to which the first retainer 712 is coupled may be rotated to perform vertical aiming.

The second aiming unit 720 of the aiming device 300 according to an embodiment may include a second body 721 and a second retainer 722 coupled with the second body 721. As described above, the second retainer 722 may be fixedly coupled to the aiming bracket 400 (in detail, the second coupling hole).

Similar to the first aiming unit 710, the second body 721 of the second aiming unit 720 may include a second pivot head 724 connected to the second aiming screw 723 and the second retainer 722, and a second moving member 725 screw-connected to the second aiming screw 723.

The second body 721 of the second aiming unit 720 has substantially the same components or operating mechanisms as the first body 711 of the first aiming unit 710, and thus, a detailed description will be replaced with the above-described content, and any redundant description will be omitted.

The second aiming unit 720 operates so that the second pivot head 724 rotates within the receiving groove of the second retainer 722 when the second moving member 725 moves linearly in either the forward or backward direction by the rotation of the second aiming screw 723, and thus, even when the second pivot head 724 moves linearly, the aiming bracket 400 to which the second retainer 722 is coupled may be rotated to perform horizontal aiming.

Meanwhile, although not illustrated, at least one of the first moving member 715 of the first aiming unit 710 and the second moving member 725 of the second aiming unit 720 may further include a driving unit (for example, a motor and a shaft) for separately moving the first pivot head 714 or the second pivot head 724 (for example, a rod equipped with a pivot head).

For example, the first aiming screw 713 or the second aiming screw 723 may be rotated by the user's operation to linearly move the first moving member 715 or the second moving member 725 itself, and if the first moving member 715 or the second moving member 725 is provided with a separate driving unit, a rod provided with the first pivot head 714 or the second pivot head 724 is connected to the driving unit (for example, screw coupled), and the driving unit may be operated by an external signal to linearly move the first pivot head 714 or the second pivot head 724.

Figure 9A:
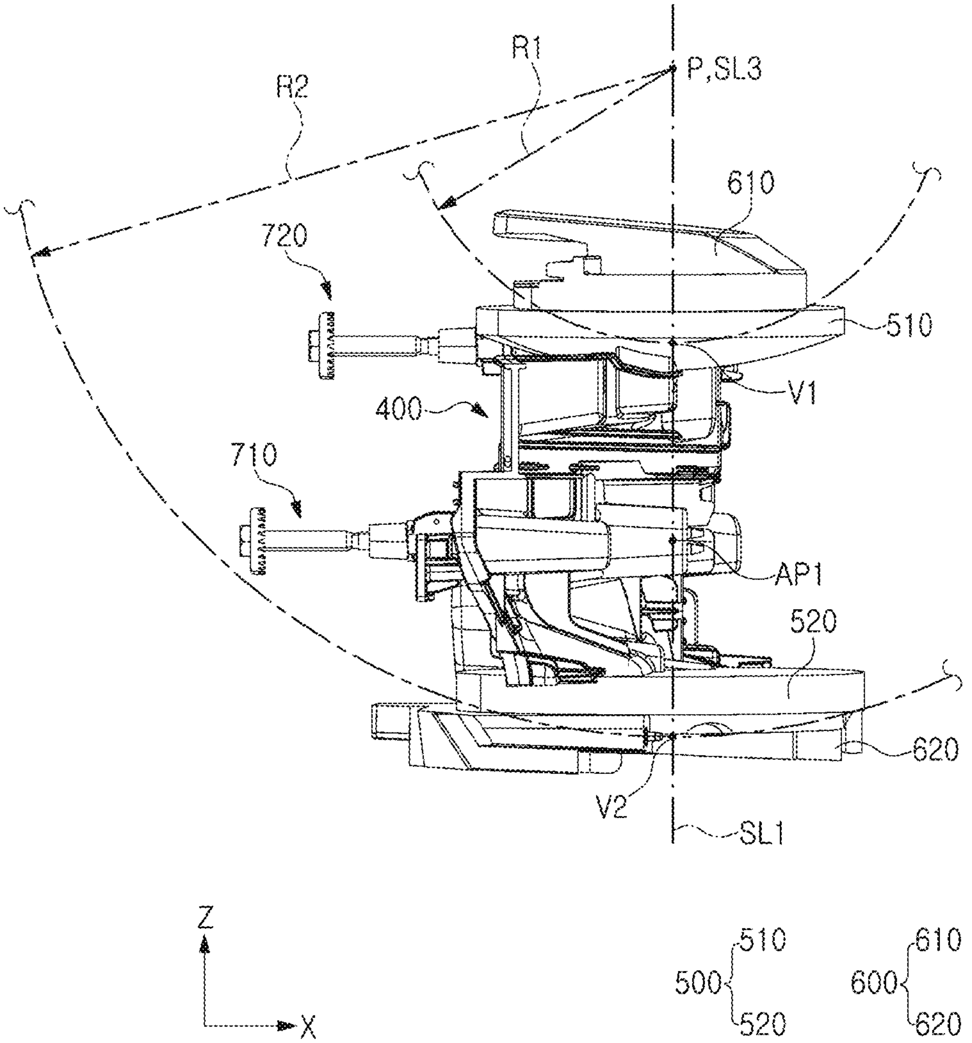
FIG. 9A, FIG. 9B, and FIG. 9C are usage diagrams illustrating a vertical aiming operation according to an embodiment.
Figure 9B:
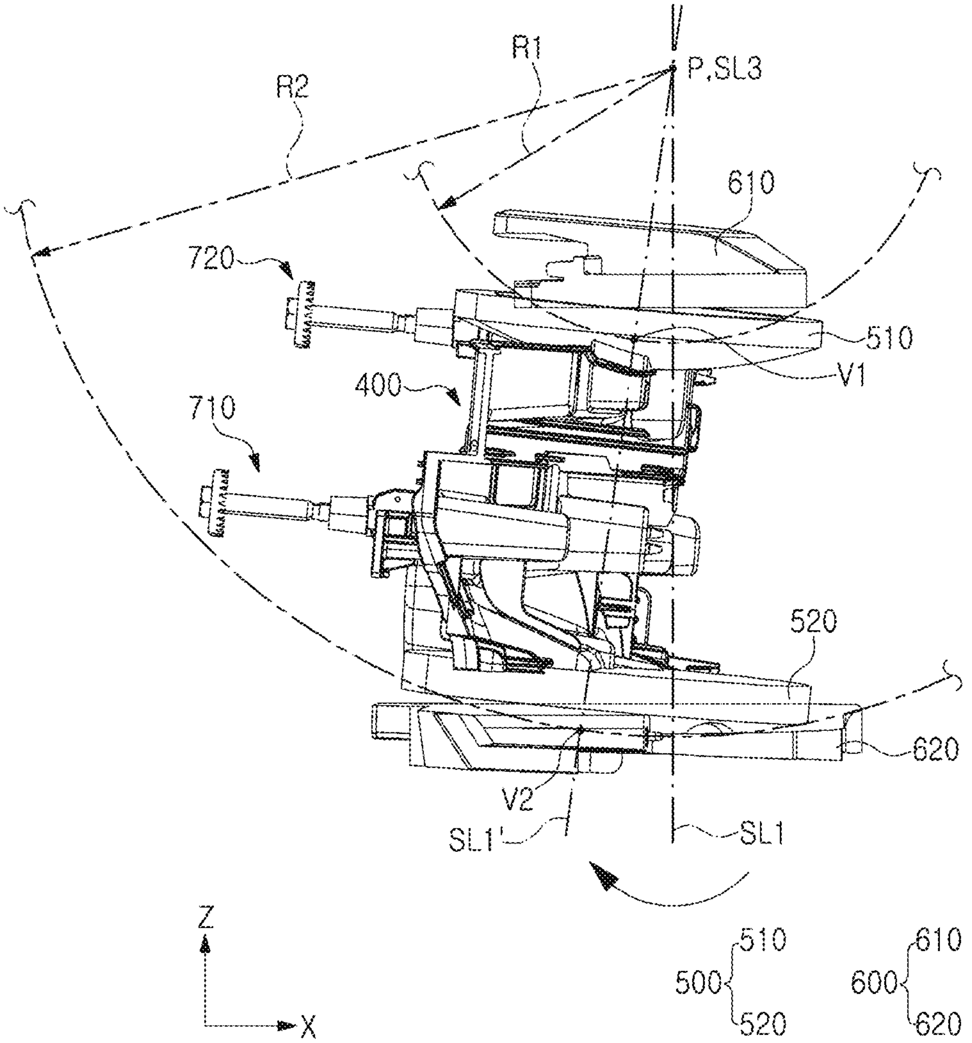
Figure 9C:
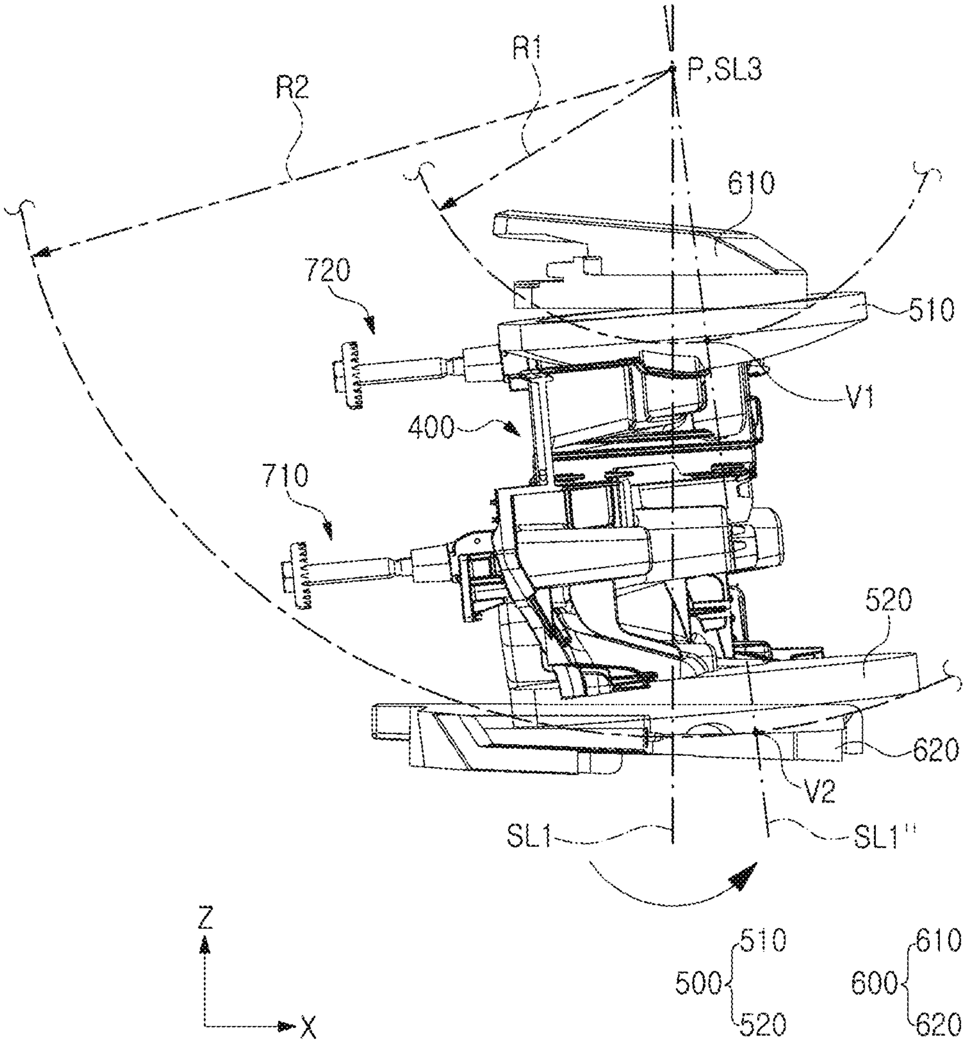
Figure 10A:
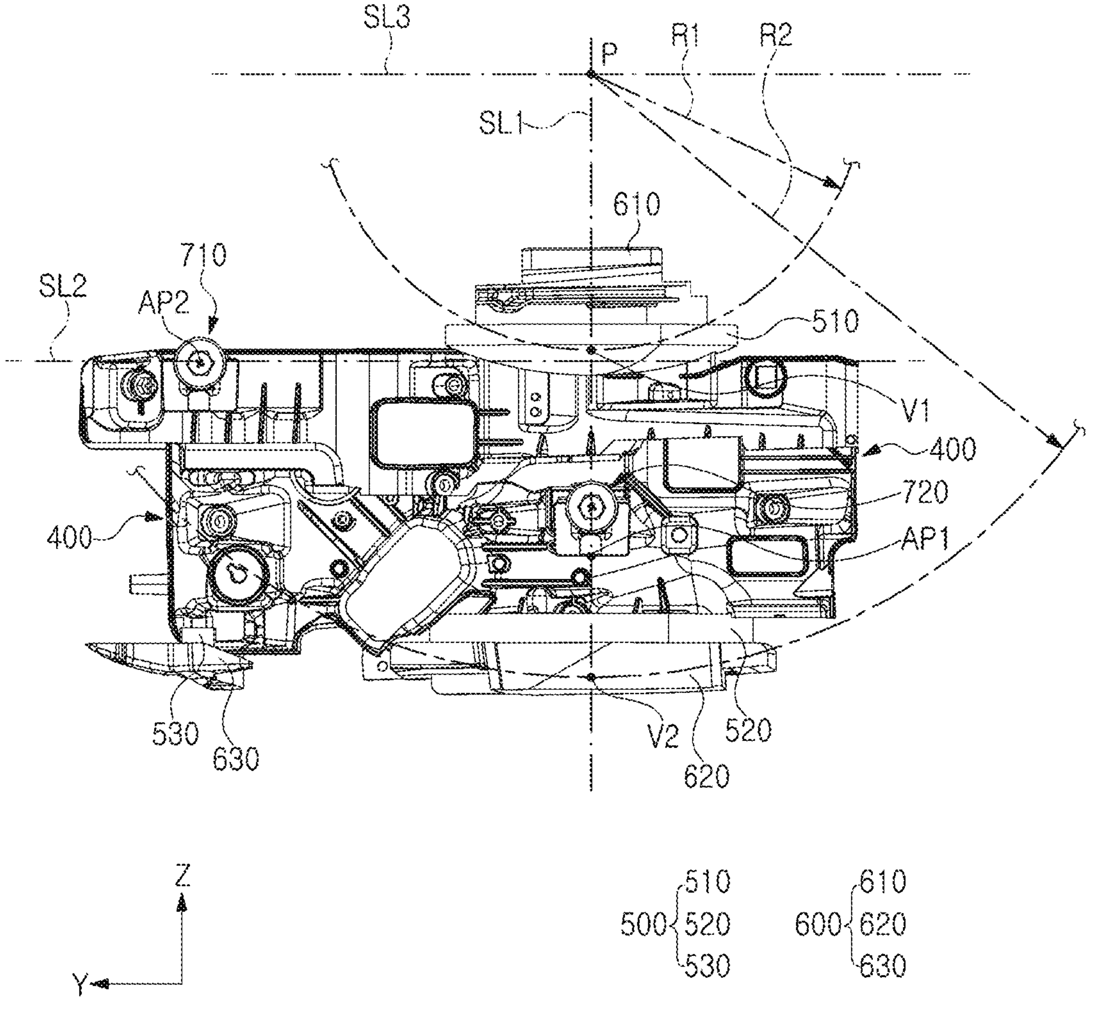
FIG. 10A, FIG. 10B, and FIG. 10C are usage diagrams illustrating a horizontal aiming operation according to an embodiment.
Figure 10B:
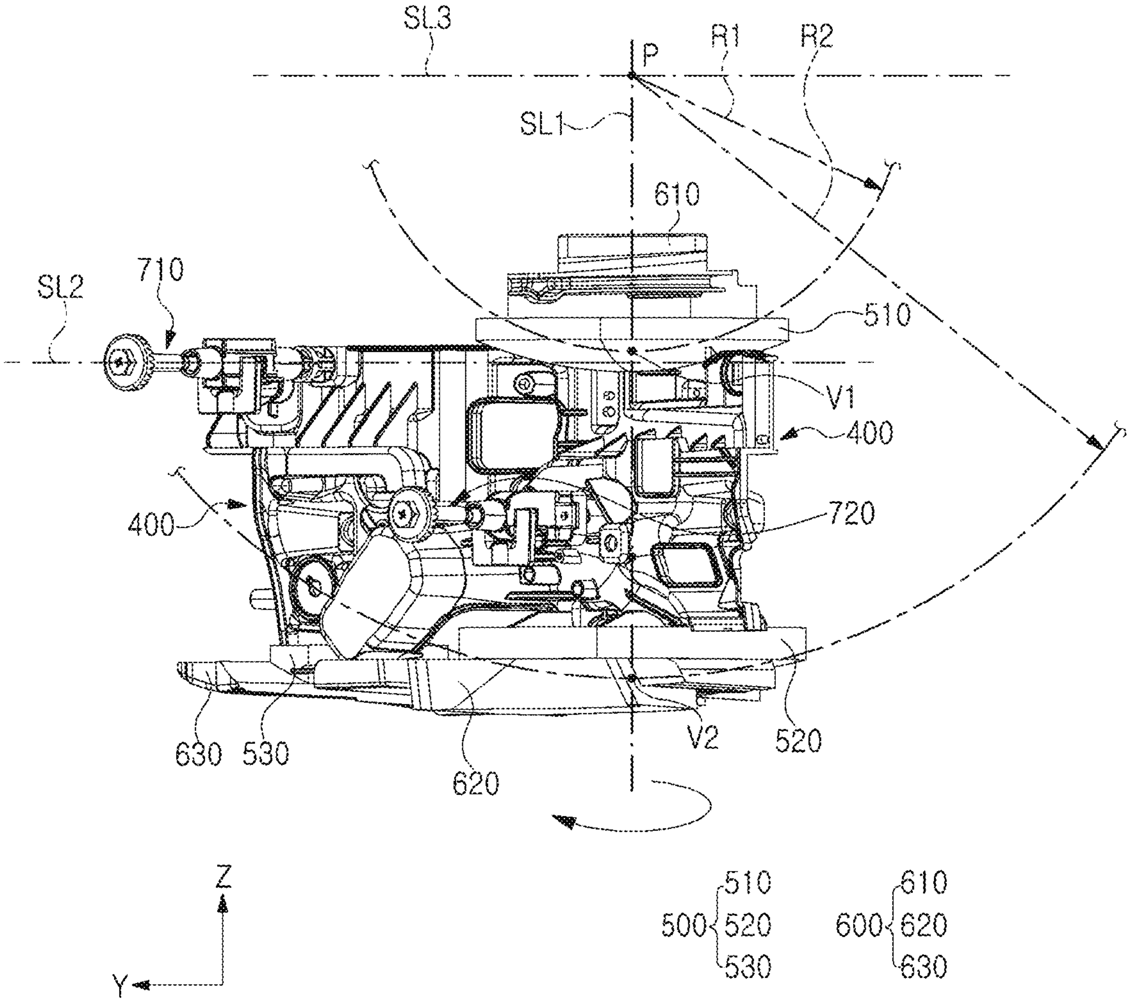
Figure 10C:
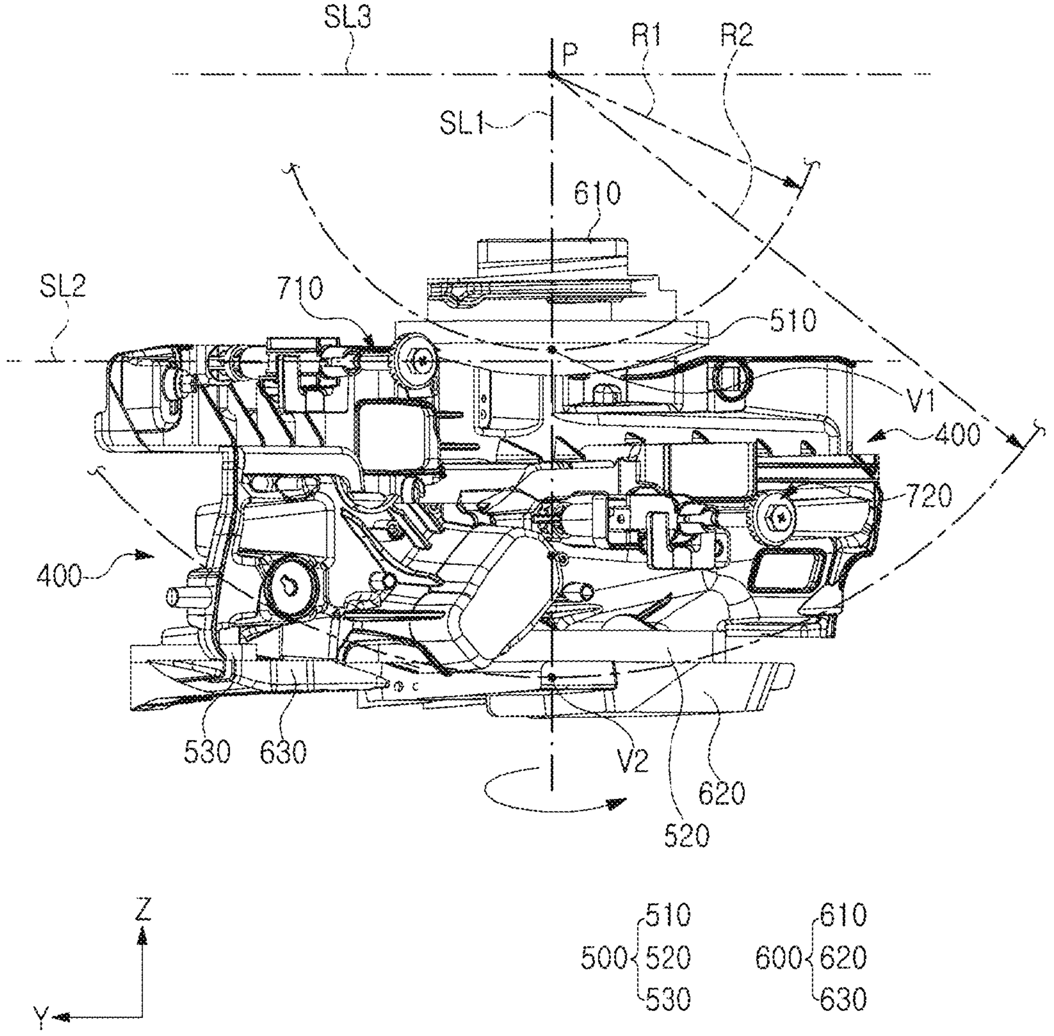

FIGS. 9A, 9B, and 9C are usage diagrams illustrating vertical aiming operations according to an embodiment, and FIGS. 10A, 10B, and 10C are usage diagrams illustrating horizontal aiming operations according to an embodiment.

FIGS. 9A, 9B, 9C, 10A, 10B, and 10C are diagrams illustrating the positions of the pivot center P formed by the aiming bracket 400 and the support portion 600, a vertical aiming point AP1 by the first aiming unit 710, and a horizontal aiming point AP2 by the second aiming unit 720 in the aiming device 300 described above with reference to FIGS. 1 to 7, and the relationship therebetween. Hereinafter, any redundant description will be omitted.

FIG. 9A and FIG. 10A illustrate the aiming device 300 in a basic state in which aiming is not performed in a horizontal or vertical direction.

The trajectories of the spheres S1, S2 and S3 in FIG. 1 and FIG. 3 are formed by the first pivot portion 510, the second pivot portion 520, the third pivot portion 530, the first support portion 610, the second support portion 620, and the third support portion 640, and are the boundaries of virtual spheres defining a rotational path of the aiming bracket 400, and correspond to the boundaries (circles) of the virtual spheres when the virtual spheres are viewed from the front and the side.

Referring to FIG. 9A and FIG. 10A, the aiming device 300 may have a pivot center P positioned outside the aiming bracket 400 as the first pivot portion 510 and the second pivot portion 520 of the aiming bracket 400 are rotatably supported by the first support portion 610 and the second support portion 620 of the support portion 600, respectively.

For example, the aiming bracket 400 may rotate within a predetermined range based on the pivot center P positioned outside the aiming bracket 400.

The pivot center P may be formed on the outside of the aiming bracket 400 when the aiming bracket 400 is viewed from the front (X-axis direction) and the side (Y-axis direction), and when viewed from the plane (Z-axis direction), the pivot center P may overlap with the base plate 410 of the aiming bracket 400.

The aiming points AP1 and AP2 are points where an external force is applied by the aiming units 710 and 720, in the aiming bracket 400. The vertical aiming point or the upper and lower aiming point AP1 of the aiming bracket 400 may correspond to the position of the first retainer 712 of the first aiming unit 710 coupled to the aiming bracket 400, and the horizontal aiming point or the left and right aiming point AP2 of the aiming bracket 400 may correspond to the position of the second retainer 722 of the second aiming unit 720 coupled to the aiming bracket 400.

The vertical aiming point AP1 may indicate the position of the first pivot head 714 of the first aiming unit 710 coupled to the first retainer 712, and the horizontal aiming point AP2 may indicate the position of the second pivot head 724 of the second aiming unit 720 coupled to the second retainer 722.

For example, the vertical aiming point AP1 may be positioned on the first pivot head 714 of the first aiming unit 710, and the horizontal aiming point AP2 may be positioned on the second pivot head 724 of the second aiming unit 720.

Accordingly, when aiming is performed based on the basic state in which aiming is not performed in the horizontal and vertical directions, the positions of the aiming points AP1, AP2 are changed, and based on this, the aiming bracket 400 rotates based on the pivot center P to perform aiming.

According to an embodiment, the aiming device 300 may have a pivot center P positioned outside the aiming bracket 400.

The vertical aiming point AP1 may be positioned vertically apart from the pivot center P.

The horizontal aiming point AP2 may be configured to be positioned horizontally apart from the pivot center P based on a virtual straight line SL1 passing through the vertical aiming point AP1.

The vertical aiming point AP1 and the pivot center P may be positioned on a virtual first straight line SL1, and the horizontal aiming point AP2 may be positioned on a second straight line SL2 perpendicular to the first straight line SL1.

In a basic state where aiming is not performed, the first straight line SL1 may be parallel to the vertical direction (or the up-down direction), and the second straight line SL2 may be parallel to the horizontal direction (or the left-right direction).

For example, when the aiming device 300 in the basic state is viewed from the side, the horizontal aiming point AP2 may be on the first straight line SL1, and when the aiming device 300 in the basic state is viewed from the planar direction, the vertical aiming point AP1 and the pivot center P may be indicated as the same point and may be on the second straight line SL2.

When vertical aiming is performed, the first straight line SL1 connecting the vertical aiming point AP1 and the pivot center P may be perpendicular to the second straight line SL2 and the third straight line SL3, respectively.

In this case, the third straight line SL3 may be a straight line that is parallel to the second straight line SL2 and passes through the pivot center P, and when vertical aiming is performed, the aiming device 300 may rotate around the third straight line SL3 as a rotation axis.

When horizontal aiming is performed, the second straight line SL2 where the horizontal aiming point AP2 is located may rotate around the first straight line SL1 as the rotation axis.

In addition, even when aiming is performed, the first straight line SL1 and the second straight line SL2 may maintain a vertical state.

However, the positions of the pivot center P, the vertical aiming point AP1, and the horizontal aiming point AP2 and relationships therebetween are not limited by the illustrated embodiment and the above-described description, and may be variously changed.

For example, the first straight line SL1 and the second straight line SL2 may not be vertical, and the first straight line SL1 may form a predetermined included angle with the vertical direction, or the second straight line SL2 may form a predetermined included angle with the horizontal direction, and in these cases, horizontal aiming and vertical aiming may be appropriately performed in response to the corresponding structure.

Referring to FIGS. 9A, 9B, and 9C, in the lamp 1, the light irradiation angle of the light source module 200 may be adjusted in the up-down direction (or vertical direction) by the operation of the first aiming unit 710.

FIG. 9A illustrates a basic state in which up-down aiming is not performed, FIG. 9B illustrates a state in which downward aiming is performed, and FIG. 9C illustrates a state in which upward aiming is performed.

When the first pivot head 714 of the first aiming unit 710 moves backward (for example, in the −X-axis direction) by the operation of the first aiming unit 710, the first pivot head 714 pulls the aiming bracket 400 backward from the vertical aiming point AP1 (for example, the point where the first retainer 712 is coupled).

The aiming bracket 400 is rotated (for example, rotated clockwise with the third straight line SL3 as the rotation axis) in the first direction based on the pivot center P along the trajectory of the sphere formed by the pivot portion 500 and the support portion 600 by the external force transmitted from the first pivot head 714, and accordingly, the light irradiation direction of the light source module 200 may be adjusted downward (for example, in the −Z-axis direction) by a predetermined angle (for example, transformed from SL1 of FIG. 9A to SL1' of FIG. 9B).

When the first pivot head 714 of the first aiming unit 710 moves forward (for example, in the +X-axis direction) by the operation of the first aiming unit 710, the pivot head pushes the aiming bracket 400 forward from the vertical aiming point AP1.

The aiming bracket 400 is rotated in the opposite direction of the first direction based on the pivot center P along the spherical trajectory formed by the pivot portion 500 and the support portion 600, by the external force transmitted from the first pivot head 714, and accordingly, the light irradiation direction of the light source module 200 may be adjusted upward (for example, in the +Z-axis direction) by a predetermined angle (for example, transformed from SL1 of FIG. 9A to SL1" of FIG. 9C).

When aiming is performed in the vertical direction by the first aiming unit 710, the aiming bracket 400 is rotated about the third straight line extending in the horizontal direction while passing through the pivot center P, as the rotation axis.

Referring to FIGS. 10A, 10B, and 10C, in the lamp 1, the light irradiation angle of the light source module 200 may be adjusted in the left-right direction (or horizontal direction) by the operation of the second aiming unit 720.

FIG. 10A illustrates a basic state in which left-right aiming is not performed, FIG. 10B illustrates a state in which right-hand aiming is performed, and FIG. 10C illustrates a state in which left-hand aiming is performed.

When the second pivot head 724 of the second aiming unit 720 moves forward (for example, in the +X-axis direction) by the operation of the second aiming unit 720, the second pivot head 724 pushes the aiming bracket 400 forward from the horizontal aiming point AP2 (for example, the point where the second retainer 722 is coupled).

The aiming bracket 400 is rotated in the second direction (for example, rotated clockwise with the first straight line SL1 as the rotation axis) based on the pivot center P along the trajectory of the sphere formed by the pivot portion 500 and the support portion, by the external force transmitted from the second pivot head 724, and accordingly, the light irradiation direction of the light source module 200 may be adjusted to a predetermined angle in the left direction (for example, +Y-axis direction) (for example, transformed from FIG. 10A to FIG. 10B).

When the second pivot head 724 of the second aiming unit 720 moves backward (for example, −X-axis direction) by the operation of the second aiming unit 720, the second pivot head 724 pulls the aiming bracket 400 backward from the horizontal aiming point AP2.

The aiming bracket 400 is rotated in the opposite direction of the second direction based on the pivot center P along the trajectory of the sphere formed by the pivot portion 500 and the support portion 600, by the external force transmitted from the second pivot head 724, and accordingly, the light irradiation direction of the light source module 200 may be adjusted to a predetermined angle in the right direction (for example, −Y-axis direction) (for example, transformed from FIG. 10A to FIG. 10C).

When aiming is performed in the horizontal direction by the second aiming unit 720, the aiming bracket 400 may be rotated about the first straight line SL1 extending in the vertical direction while passing through the pivot center P as the rotation axis.

As set forth above, according to an embodiment, a lamp may have a structure that is robust against vehicle vibration by providing an aiming pivot center on the outside of the lamp, and as an aiming bracket to which a light source module is coupled is in spherical contact with a support portion to support a load from below.

The effects of the present disclosure are not limited to those described above, and other effects not mentioned will be clearly recognized by those skilled in the art from the description below.

While example embodiments have been illustrated and described above, it will be apparent to those skilled in the art that modifications and variations could be made without departing from the scope of the present disclosure as defined by the appended claims.

In addition, in the embodiments of the present disclosure, some components may be implemented in a deleted state, and the configurations of each embodiment may be configured by being combined with each other.

The invention claimed is:

1. A lamp comprising:
a lamp housing;
an aiming bracket coupled to a light source module, the aiming bracket being rotatably disposed around a pivot center;
a support portion coupled to an inside of the lamp housing, and rotatably supporting the aiming bracket;
a first pivot portion having a first contact surface and positioned above the aiming bracket; and
a second pivot portion having a second contact surface and positioned below the aiming bracket,
wherein the pivot center is positioned on an outside of the aiming bracket; and
wherein a first center of a sphere formed by the first contact surface and a second center of a sphere formed by the second contact surface each correspond to the pivot center.

2. The lamp of claim 1, comprising a pivot portion supporting the aiming bracket by contacting the support portion and coupled to a first end and a second end of the aiming bracket, wherein a contact surface of the pivot portion and the support portion is spherical.

3. The lamp of claim 1, wherein a first radius of a sphere formed by the first contact surface is smaller than a second radius of a sphere formed by the second contact surface.

4. The lamp of claim 1, wherein a contact area of the second contact surface is larger than a contact area of the first contact surface.

5. The lamp of claim 1, wherein the aiming bracket further includes a base plate to which the light source module is coupled, wherein the base plate is positioned between the first pivot portion and the second pivot portion.

6. The lamp of claim 1, wherein the light source module comprises a plurality of light source modules.

7. The lamp of claim 1, wherein the light source module comprises a first light source module and a second light source module positioned vertically below the first light source module.

8. A lamp comprising:
a lamp housing;
an aiming bracket coupled to a light source module, the aiming bracket being rotatably disposed around a pivot center;
a support portion coupled to an inside of the lamp housing, and rotatably supporting the aiming bracket;
a first pivot portion having a first contact surface and positioned above the aiming bracket;
a second pivot portion having a second contact surface and positioned below the aiming bracket; and
a third pivot portion spaced apart from the first pivot portion and the second pivot portion, and having a third contact surface;

wherein the pivot center is positioned on an outside of the aiming bracket; and wherein the third contact surface is spherical.

9. The lamp of claim 8, wherein a third center of a sphere formed by the third contact surface corresponds to the pivot center.

10. The lamp of claim 8, wherein a third radius of a sphere formed by the third contact surface is larger than a first radius of a sphere formed by the first contact surface and a second radius of a sphere formed by the second contact surface.

11. The lamp of claim 8, wherein a first vertex of the first contact surface, the pivot center, and a second vertex of the second contact surface are connected by a virtual straight line, and wherein the third pivot portion is configured to be spaced apart from the straight line.

12. The lamp of claim 1, further comprising:

a first aiming unit connected to a vertical aiming point of the aiming bracket and configured to rotate the aiming bracket in a vertical direction; and a second aiming unit connected to a horizontal aiming point of the aiming bracket and configured to rotate the aiming bracket in a horizontal direction.

13. The lamp of claim 12, wherein a first vertex of the first contact surface, the pivot center, and a second vertex of the second contact surface are connected by a virtual straight line, and the vertex aiming point is located on the virtual straight line.

14. The lamp of claim 13, wherein each of the first aiming unit and the second aiming unit includes a main body having an aiming screw and a pivot head, and a retainer into which the pivot head is rotatably inserted, wherein the retainer is fixedly connected to the aiming bracket.

15. A vehicle comprising:

a lamp comprising:

a lamp housing coupled to the vehicle;

an aiming bracket coupled to a light source module, the aiming bracket being rotatably disposed around a pivot center;

a support portion coupled to an inside of the lamp housing, and rotatably supporting the aiming bracket;

a first pivot portion having a first contact surface and positioned above the aiming bracket;

a second pivot portion having a second contact surface and positioned below the aiming bracket; and a third pivot portion spaced apart from the first pivot portion and the second pivot portion, and having a third contact surface;

wherein the pivot center is positioned on an outside of the aiming bracket; and wherein the third contact surface is spherical.

16. The vehicle of claim 15, further comprising:

a first aiming unit connected to a vertical aiming point of the aiming bracket and configured to rotate the aiming bracket in a vertical direction; and a second aiming unit connected to a horizontal aiming point of the aiming bracket and configured to rotate the aiming bracket in a horizontal direction.

* * * * *